United States Patent [19]
Smith

[11] Patent Number: 5,889,933
[45] Date of Patent: Mar. 30, 1999

[54] ADAPTIVE POWER FAILURE RECOVERY

[75] Inventor: Gerald E. Smith, Boynton Beach, Fla.

[73] Assignee: AIWA Co., Ltd., Tokyo, Japan

[21] Appl. No.: 794,235

[22] Filed: Jan. 30, 1997

[51] Int. Cl.$^6$ ................................................. G06F 11/00
[52] U.S. Cl. ................................ 395/182.2; 395/182.04; 395/182.18
[58] Field of Search ................... 395/182.04, 182.03, 395/182.07, 182.12, 182.2, 182.18; 711/114, 113

[56] References Cited

U.S. PATENT DOCUMENTS

| | | | |
|---|---|---|---|
| 4,323,987 | 4/1982 | Holtz et al. | 365/229 |
| 4,506,323 | 3/1985 | Pusic et al. | 364/200 |
| 4,712,195 | 12/1987 | Finger | 365/226 |
| 4,763,333 | 8/1988 | Byrd | 371/66 |
| 4,882,711 | 11/1989 | Guillot | 365/229 |
| 4,959,774 | 9/1990 | Davis | 365/200 |
| 4,965,828 | 10/1990 | Ergott et al. | 380/50 |
| 5,204,963 | 4/1993 | Noya et al. | 395/182.12 |
| 5,208,813 | 5/1993 | Stallmo | 371/10.1 |
| 5,235,601 | 8/1993 | Stallmo | 371/40.1 |
| 5,241,508 | 8/1993 | Berenguel et al. | 365/229 |
| 5,359,569 | 10/1994 | Fujita et al. | 365/229 |
| 5,379,417 | 1/1995 | Lui et al. | 395/575 |
| 5,381,554 | 1/1995 | Langer et al. | 395/182.12 |
| 5,410,713 | 4/1995 | White et al. | 395/750 |
| 5,414,861 | 5/1995 | Horning | 395/182.12 |
| 5,530,948 | 6/1996 | Islam | 395/182.04 |
| 5,533,190 | 7/1996 | Binford et al. | 395/182.04 |
| 5,586,291 | 12/1996 | Lasker et al. | 711/113 |

FOREIGN PATENT DOCUMENTS 0 551 009-A2  7/1993  European Pat. Off. .

OTHER PUBLICATIONS

Article by Paul Massiglia, entitled "The Raidbook" published by *The Raid Advisory Board* Aug. 8, 1994, pp. Title page, II, V, VI, 130, 131.

Article by *The Raid Advisory Board* entitled "The RaidPrimer" First Edition, published, Mar. 1994, pp. 3 sheets.

Article by Product Preview, DS1345YLPM/ABLPM Copyright © 1993, Dallas Semiconductor Corporation.

Article by Product Preview, DS1330YLPM/ABLPM, Copyright © 1993, Dallas Semiconductor Corporation.

*Primary Examiner*—Ly Hua
*Attorney, Agent, or Firm*—Graham & James LLP

[57] ABSTRACT

A RAID system that uses non-volatile random access memory (NVRAM) to greatly reduce the chance of loss of data due to an AC power failure. This RAID system has two write modes. In a normal write mode, a host computer receives a write confirmation once an array controller receives data from the host computer. In a safe write mode, however, the array controller copies to NVRAM all data received from the host computer for writing to disk drives. In this safe write mode, the array controller sends the write confirmation to the host computer only after storing the data in NVRAM. To switch appropriately between the normal and safe write modes, the array controller polls a power-out flag provided by a UPS (uninterruptable power supply) to determine whether there has been an AC power failure. The array controller switches between the two write modes depending on the status of the power-out flag.

23 Claims, 15 Drawing Sheets

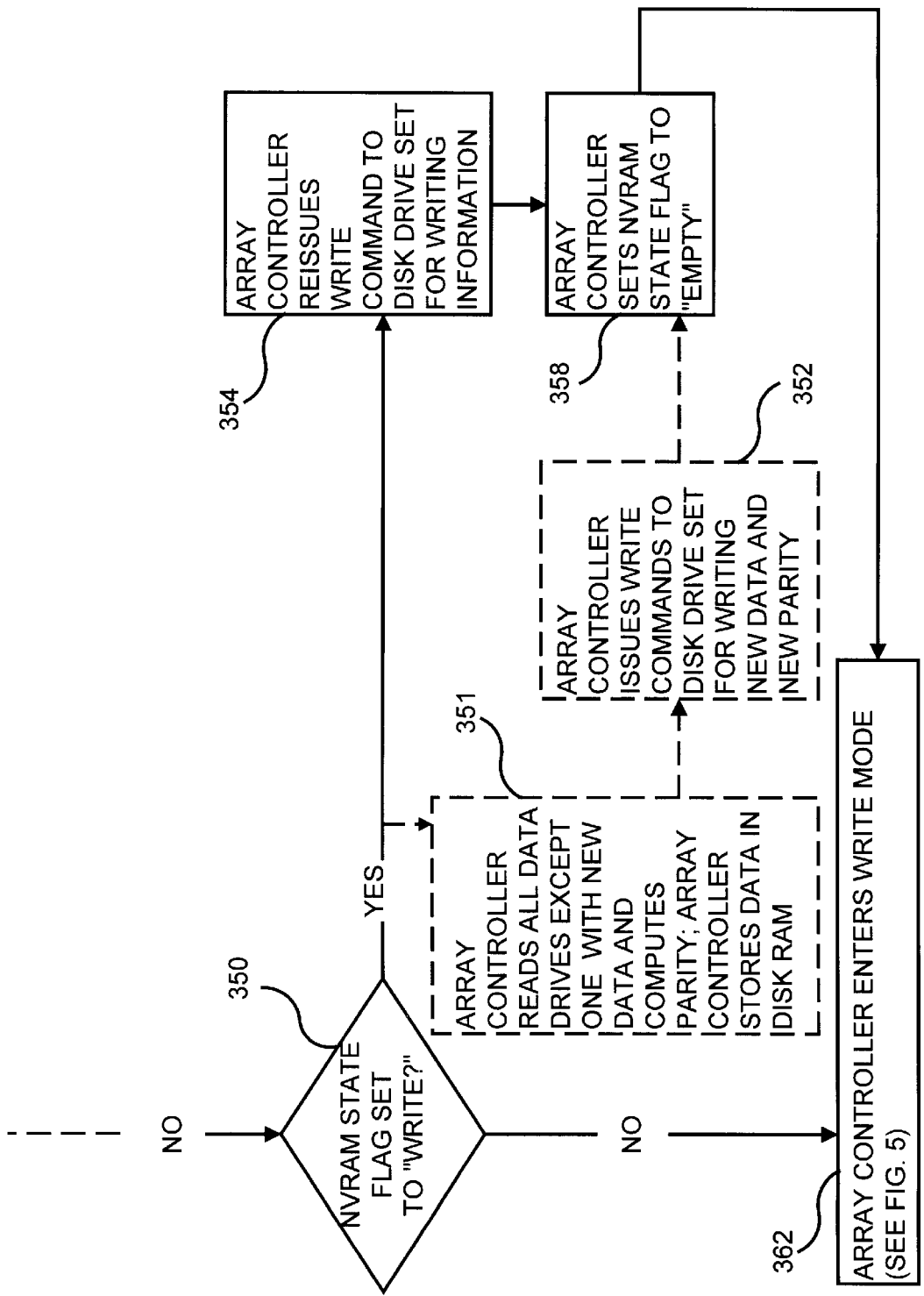

ADAPTIVE POWER FAILURE RECOVERY

FIELD OF THE INVENTION

This invention relates to data protection systems for computer systems and more particularly to an apparatus and method of adaptive power failure recovery that ensures that there is no data loss due to a pending power failure.

BACKGROUND OF THE INVENTION

A well-known problem in electrical systems is the possibility of electrical power outages. Some electrical systems use batteries for additional power back up.

An example of a system that can use a battery for back up in case of a power outage is a RAID system. RAID stands for Redundant Arrays of Inexpensive Disks. RAID systems have two or more disk drives that cooperate to increase performance and fault tolerance. Typically, RAID systems include a host computer, an array controller, and disk drives. The array controller serves as an interface between the host computer and the disk drives connected to the array controller. The host computer writes data to and reads data from any of the disk drives via the array controller.

When, for example, the host computer needs to write data to disk drives, the array controller receives that data from the host computer and stores the data in a disk RAM (Random Access Memory). The array controller then takes this data from the disk RAM and writes it to a single disk drive, or even to multiple disk drives.

The entire RAID system is powered by a main power supply. Since that power supply can fail, a RAID system may have a battery for back up to power the RAID system while the main power supply is down. An example of a battery back up is a UPS (Uninterruptable Power Supply).

Generally, during normal operation, a host computer will, for instance, write streams of data to the array controller for storing the data on disk drives. The array controller, having received a data stream, acknowledges receipt thereof to the host computer by sending a "COMMAND COMPLETE" message to the host computer. However, typically, instead of immediately writing the data to the disk drives, initially the array controller stores the data stream in disk RAM. A disk drive to which data is to be written may be busy storing other data sent to it previously. Consequently, data in disk RAM may be held there by the array controller until a particular disk drive is available for being written to. Later, when a disk drive is available, the array controller takes the data from the disk RAM to distribute it appropriately to disk drives.

Some RAID systems notify the host computer of a write having been completed only once the data actually has been written to a disk drive. This delayed confirmation of writes avoids the possibility that a host computer may record a write transaction as having been completed, which actually was never completed. The write transaction may never have been completed, because a power failure (or even a UPS failure) occurred while the array controller was writing the data to the disk drive or, for example, the disk drive was writing the data to a disk.

The following paragraphs illustrate the problem that a power outage can create for a database that relies on a RAID system. For instance, an accounting system may use several databases that are stored on disk drives. One database may contain a parts inventory. Another database may contain customer records. A third database may contain invoices.

An accounting application computer program stored on the host computer could use these databases as follows. A customer orders a part, and the part is shipped to the customer. Then the accounting system database needs to update the parts inventory, the customer records, and the invoice databases to reflect the changes. Consequently, the application program sends data reflective of a change in inventory to the array controller for storage on the disk drives, so that the inventory database reflects that there is one less part available, because the part was shipped to the customer. Similarly, the application program would write data to the array controller for updating the customer records database showing that the customer now owes an increased amount, i.e., the increase would be the cost for the parts shipped to the customer. Finally, the application program would direct the host computer to send data to the array controller reflecting that an invoice has been sent to a customer, if that actually had occurred.

However, a power failure may have occurred between the actual time that the customer records were updated and the parts inventory database was updated, i.e., parts inventory data was written to the disk drives and stored by the disk drives, and the time that the invoices databases would have been updated. The data to be written to the invoices database may have been in disk RAM at the time that the power failure occurred and consequently be lost. Sometime later, when the power to the RAID system is re-established, the application program may find that the invoices database had not been updated and may therefore cause shipping twice the invoice to the customer.

To avoid loss of data, some RAID systems back up the disk RAM with a battery all of the time, in addition to using a UPS. Backing up disk RAM with a battery permits the array controller to complete transactions which would otherwise be interrupted by a power outage, once the UPS fails without warning, as further explained below. However, backing up disk RAM with a battery can be expensive. Disk RAMs typically have four to eight megabytes storage capability. After a power failure occurs, continuously powering such disk RAMs with a separate battery for all reads and writes of data can require a significant size battery, depending on the length of time for which the back-up battery power is required.

A UPS can notify a system that power has shut down and that power is available from the UPS only for a finite amount of time. That finite time is a function of the size of the battery of the UPS. However, the time estimate provided by the UPS may be incorrect. Consequently, the UPS may run out of power before the estimated time provided by the UPS. So, data being written to disk drives may be lost without additional battery back-up for the disk RAM, because when the UPS fails, the array controller may have been writing data to the disk drives. But, as stated above, back-up batteries for disk RAM can be expensive.

SUMMARY OF THE INVENTION

The invention may include a RAID system that uses non-volatile random access memory (NVRAM) to greatly reduce the chance of loss of data due to an AC power failure. This RAID system has two write modes. In a normal write mode, a host computer receives a write confirmation once an array controller receives data from the host computer. In a safe write mode, however, the array controller copies to NVRAM all data received from the host computer for writing to disk drives. Only thereafter does the array controller send the write confirmation to the host computer. To switch appropriately between the normal and safe write modes, the array controller polls a power-out flag provided by a UPS (Uninterruptable Power Supply). The array controller checks the status of the power-out flag to determine whether there has been an AC power failure.

Use of NVRAM avoids the cost associated with adding back-up batteries to RAID systems. Storing data on the NVRAM avoids loss of data due to sudden power failure, such as power failure due to an inaccurate prediction by the UPS of how long power is available following a failure of AC power or simply due to UPS battery exhaustion by a UPS without prediction capability.

From a system point of view, a data storage system may comprise the following components. The system includes a non-volatile memory and an array controller. The array controller is for coupling to a UPS, for coupling to a host CPU, for coupling to a power source, and for coupling to a permanent memory, such as a disk drive. The array controller further is coupled to the non-volatile memory for saving write command information including data upon a failure of the power source.

From a process point of view the invention may include the following steps for avoiding loss of data due to a power outage. The steps include receiving a host write command including the data from a host CPU, storing the data in volatile memory, and determining whether there is a power outage. Additional steps are, if there is no power outage, sending a write confirmation to the host CPU, and if there is a power outage, writing the data to non-volatile memory. Moreover, if there is a power outage, the process includes the step of sending a write confirmation to the host CPU, after the step of writing to non-volatile memory.

BRIEF DESCRIPTION OF THE DRAWINGS

FIGS. 3A and 3B are flow charts illustrating the performance of the array controller upon turn on of the RAID system, in accordance with the first and a second preferred embodiments of the invention.

DETAILED DESCRIPTION OF THE PREFERRED EMBODIMENTS

Preferred embodiments of the invention eliminate the need for constant battery backup for, for instance, a RAID system. In these preferred embodiments, a UPS (Uninterruptable Power Supply) sets a flag when there is a power failure. Upon receiving the power failure signal, the RAID system begins operating in a safe mode. As further discussed below, the safe mode includes writing data to non-volatile memory, such as a NVRAM (Non-volatile Random Access Memory). NVRAMs do not require separate power supplies to hold data for years, even after the external power supply fails. Consequently, data stored in the NVRAM can be retrieved by the RAID system, once the main power supply recovers. The NVRAM can be kept small to minimize cost. An example of an NVRAM is a 1024K non-volatile SRAM by Dallas Semiconductor Corporation (DS1345YLPM/ABLPM) and a 256K non-volatile SRAM (Part No. DS1330YLPM/ABLPM) also by Dallas Semiconductor Corporation. Another example of non-volatile memory is flash memory like flash RAM.

Figure 1:
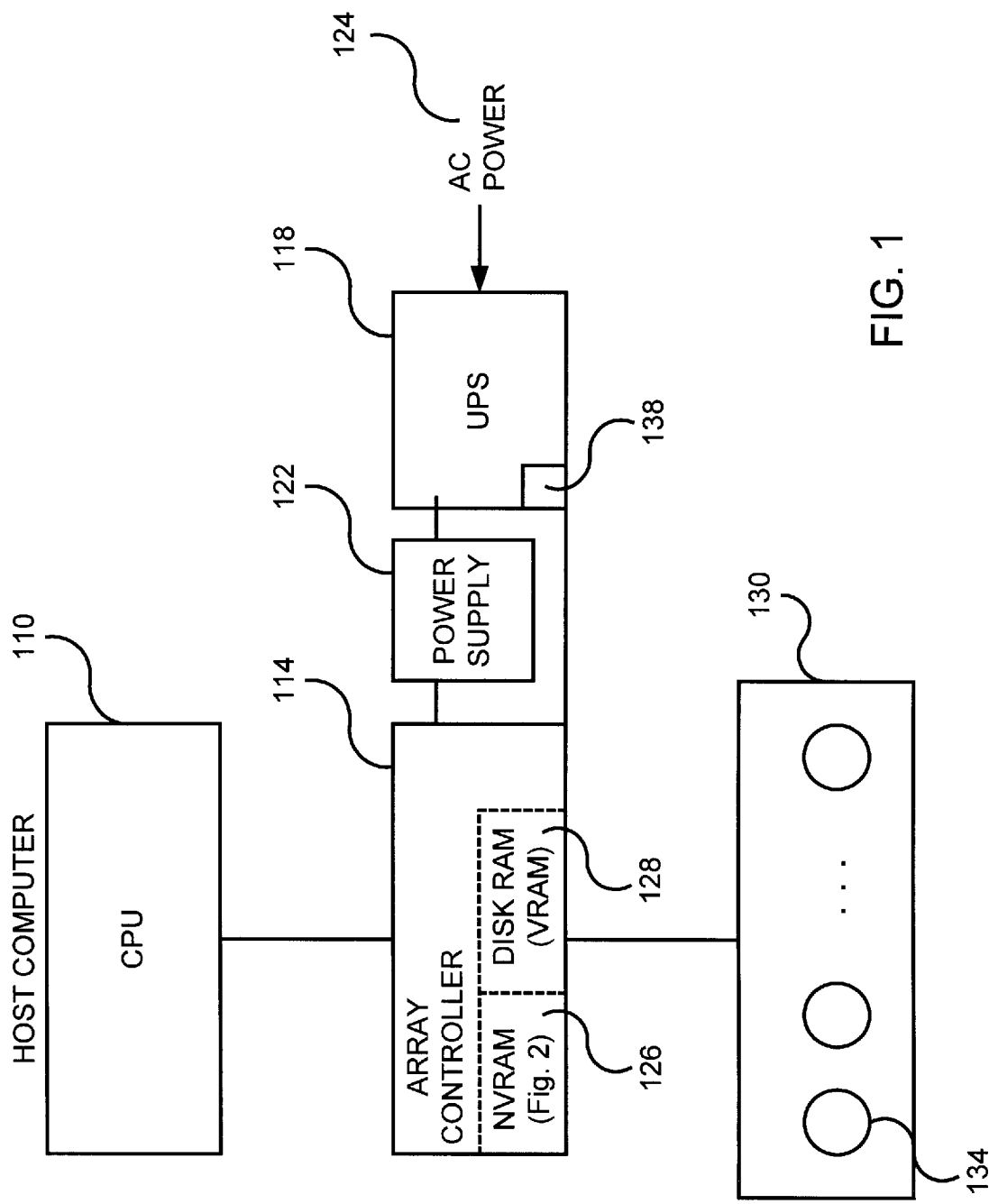
FIG. 1 is a diagram of a RAID system, in accordance with a preferred embodiment of the invention.

FIG. 1 illustrates a first preferred embodiment of the invention implemented in a RAID system. FIG. 1 is a block diagram of a RAID system that uses a UPS in combination with an NVRAM to prevent loss of data due to failure of a power supply. In FIG. 1, a host computer that includes a CPU 110 is coupled to an array controller 114. The array controller 114 is connected to a power supply 122 for providing a source of electric power. The power supply 122 in turn is connected to a UPS 118, which is connected to an AC (alternating current) power source 124. While FIG. 1 explicitly shows power supply 122, some UPS 118 include a power supply 122. Upon failure of power source 124, the UPS sets a power-out flag 138. The array controller 114 includes NVRAM 126 and Disk RAM 128. The NVRAM 126 is further illustrated in FIGS. 2 and 9. The array controller 114 is connected to a set of disk drives 130, which include hard disk drives 134.

The function of the system of FIG. 1 is as follows. The CPU 110 writes data to disk drive set 130 via array controller 114. The array controller 114 accepts the data from the CPU 110. In a normal write mode, the array controller 114 immediately notifies the CPU 110 that the data has been written to a disk drive set 130. However, in actuality, the array controller 114 usually only has stored the data received from the CPU 110 in disk RAM 128, i.e. volatile memory 128, such as DRAM (dynamic RAM). Disk RAM 128 is large compared to NVRAM 126. Disk RAM 128 serves as a memory buffer for rapidly storing data from the CPU 110. Having the memory buffer 128 is useful, because the CPU 110 can send data to the array controller 114 rapidly compared to the speed with which the array controller 114 in turn can store the data on disk drive set 130.

Writing data to disk drive set 130 is a slow process, because it involves several I/O (input/output) operations. For instance, in a RAID system with only three hard disk drives 134 in disk drive set 130, in RAID level four, the process of writing new data to disk drive set 130 involves the following. As is well known in the art, typically data is stored on the first two disks while parity data is stored on the third disk. To store data on the first disk, in a first I/O step, old data is read from the first hard disk. Concurrently, in another I/O step, old parity data is read from the third hard disk. Thereafter, the old data from the first hard disk is exclusive ORed with the old parity data on the third hard disk. The result of this operation is an intermediate (or modified) parity. Next, the array controller 114 exclusive ORes the modified parity with the new data. The result of this exclusive OR operation is a new parity. In final I/O steps, this new parity is stored by the array controller 114 on the parity drive, i.e. the third hard disk. Concurrently, the array controller 114 stores the new data on the first hard disk.

In this example of the RAID level four system, the power source 124 could fail even before the first I/O step has been executed. In a prior art system, the CPU 110 still would receive confirmation from the array controller 114 that the data has been written to disk drive set 130. Similarly, in a prior art system, the power source 124 also can fail between the last two I/O steps of the above example. Should such a failure of power source 124 occur at that time, then the parity data on the third hard disk would not be synchronized with the data on the first hard disk.

To avoid loss of data due to failure of power source 124, the UPS 118 sets the power-out flag 138 to warn the array controller 114 that a power failure has occurred. As further discussed below, with respect to FIG. 6, the array controller 114 periodically polls the UPS 118 to determine the status of the power-out flag 138. When the array controller 114 determines that the power-out flag 138 has been set, the array controller 114 enters a safe write mode, as further discussed below with respect to FIGS. 4, 4A, and 4B. In the safe write mode, the array controller 114 copies data received from the CPU 110 to the NVRAM 126. For each write data command that the CPU 110 sends to the array controller 114, the array controller 114 creates a segment in the NVRAM 126. In that safe write mode, the array controller 114 does not confirm to the CPU 110 that data was written to disk drive set 130 until that data is written to NVRAM 126.

Figure 2:
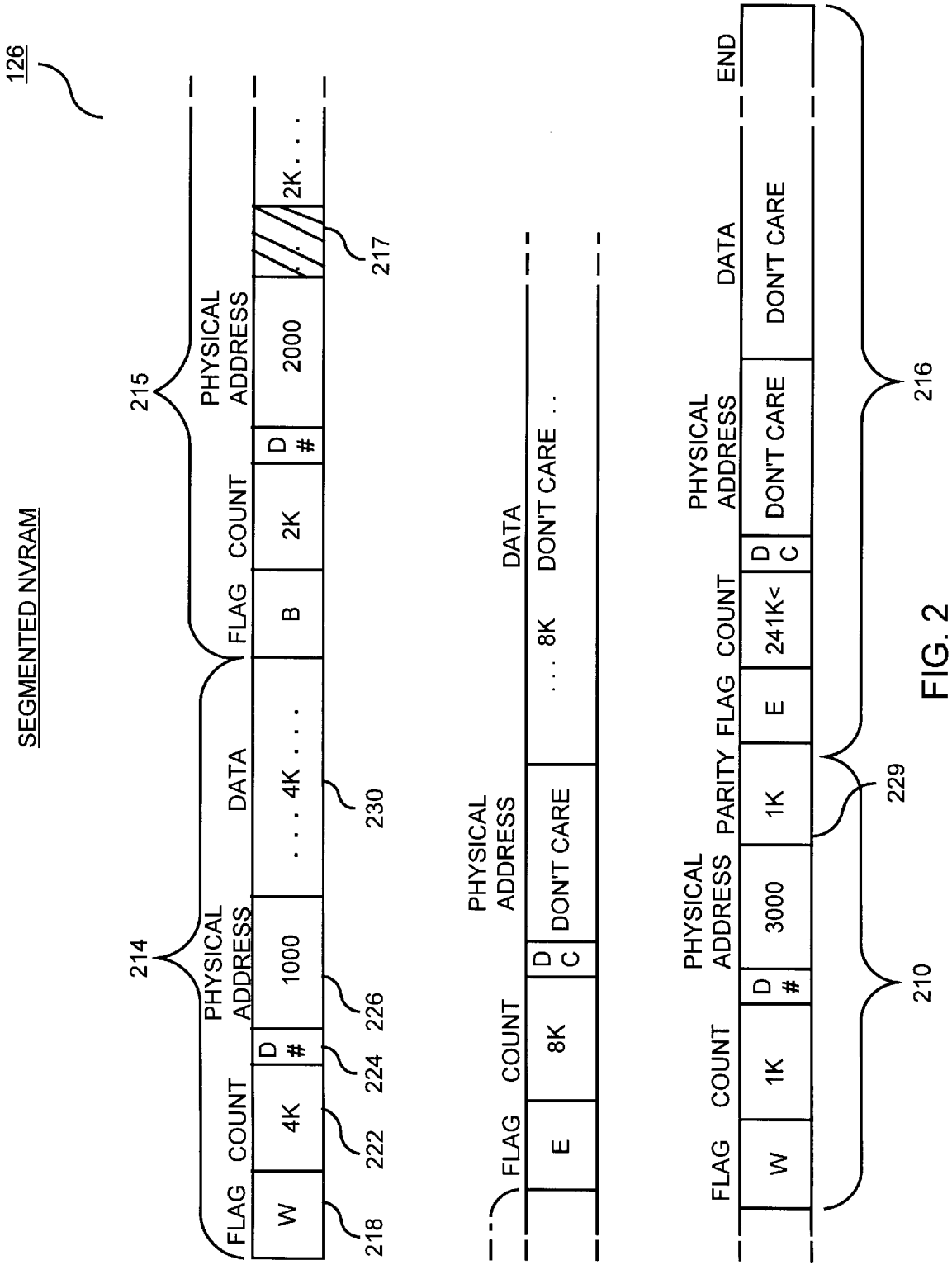
FIG. 2 is a diagram illustrating a segmented NVRAM, in accordance with a first preferred embodiment of the invention.

FIG. 2 illustrates a segmented NVRAM 126. The NVRAM has segments, such as segments 210, 214 215, and 216, typically of different sizes. These segments are stored one after another, as illustrated in FIG. 2. As will be clear to one of ordinary skill in the art based on the description herein, the NVRAM 126 can also include segments all of one size as well. The creation of these segments in the NVRAM 126 is further discussed in the context of FIG. 4.

The size of these segments varies with the amount of information associated with a particular write command. So, as illustrated in FIG. 2, segment 210 has less data (parity 229) for writing to disk drive set 130 than does segment 214, since segment 210 having 1 K(kilo)byte of parity 229 is smaller than segment 214 having 4 Kbytes of data 230. Having variable segment sizes, provides flexibility in using limited NVRAM memory space for particular data records. So, for example, if, in a particular application, data records can be large although rarely so, then for an NVRAM 126 with fixed size segments only a relatively small number of segments could be created, because each segment would have to be at least as large as the largest possible data record.

The data 230 is not necessarily the raw host data provided by the CPU 110 to the array controller 114. For instance, data 230 may be only part of the raw data from CPU 110. For ease in storing the raw data in the disk drive set 130, the array controller 114 in the embodiment of FIG. 2 may have distributed the raw data into several segments, such as segment 214.

Each segment contains a transactional record. Each transactional record includes data, such as a state flag 218, a count 222, a disk drive number 224, an address 226, and the data 230 from host 110. The state flag 218 is a three state flag. In the empty state "E" (hereinafter "EMPTY"), the state flag 218 signifies that no data is stored in the particular segment associated with that state flag 218. In a building NVRAM state "B" (hereinafter "BUILD"), the state flag 218 signifies that the array controller 114 is storing a transactional record in the NVRAM 126. In a writing to disk state "W" (hereinafter "WRITE"), the state flag 218 signifies that data (part or all of the raw data or parity) associated with the corresponding segment is being written by the array controller 114 to disk drive set 130. The state flag 218 can be represented by, for instance, one byte of data.

The count 222, such as 4 Kbytes for segment 214, specifies the size of the data block 230 by, specifying, for instance, the size of data 230 in Kbytes. The count may be represented by data, for example, 2 bytes long. Alternatively, count 222 could specify the number of sectors of hard disk space that the particular record requires. The array controller 114 specifies the disk drive number 224, which in turn specifies the particular disk drive 134 in disk drive set 130 that is the destination of data 230. The array controller 114 further determines the physical address 226.

The physical address 226 is, for instance, a 4-byte disk address, i.e. the location on a particular hard disk drive 134, where the corresponding data is to be stored. The physical addresses 226 shown in FIG. 2 specify the particular sector starting at which data is to be stored on a particular disk. Each sector typically can store one half of one Kbyte of data. The array controller 114 computes the physical addresses 226 from a logical array address 914 (see FIG. 9) provided by the CPU 110 as part of the CPU's 110 write command. The logical address 914 is the particular address that the CPU 110 uses to reference raw data 930 irrespective of the raw data's 930 actual location in disk drive set 130. In a second embodiment, as discussed below, the array controller 114 stores neither a disk drive number 224 nor a physical address 226 in the NVRAM 126, but instead only the logical address 914 (see FIG. 9).

Segment 215 differs from segments 210, 214 in that the flag is set to "BUILD" instead of to "WRITE." As illustrated in FIG. 2, only half of segment 215's 2 Kbyte data has been stored, as indicated by the shaded region 217. Segment 216 differs from segments 210, 214, 215, in that the flag in segment 216 is set to "EMPTY." Segment 216 is larger than any of the other segments shown in FIG. 2. Since segment 216 does not contain any data 230, the disk number 224, the address 226, and data 230 of segment 216 are in "DON'T CARE" states. The count 222 of segment 216 is less than 241 Kbytes, for a 256K NVRAM 126, since some of the memory space of the NVRAM 126 is occupied by flags 218, counts 222, disk numbers 224, and addresses 226 of all segments of the NVRAM 126.

Upon power-up, as discussed below, the array controller 114 is configured to start searching for the NVRAM data at one fixed start point. At that start point, segment 214 begins. Alternatively, the array controller 114 can obtain a pointer to the first segment 214. While the pointer is located at one location, the pointer may point to different locations where the first segment 214 is stored in NVRAM 126.

Figure 3A:
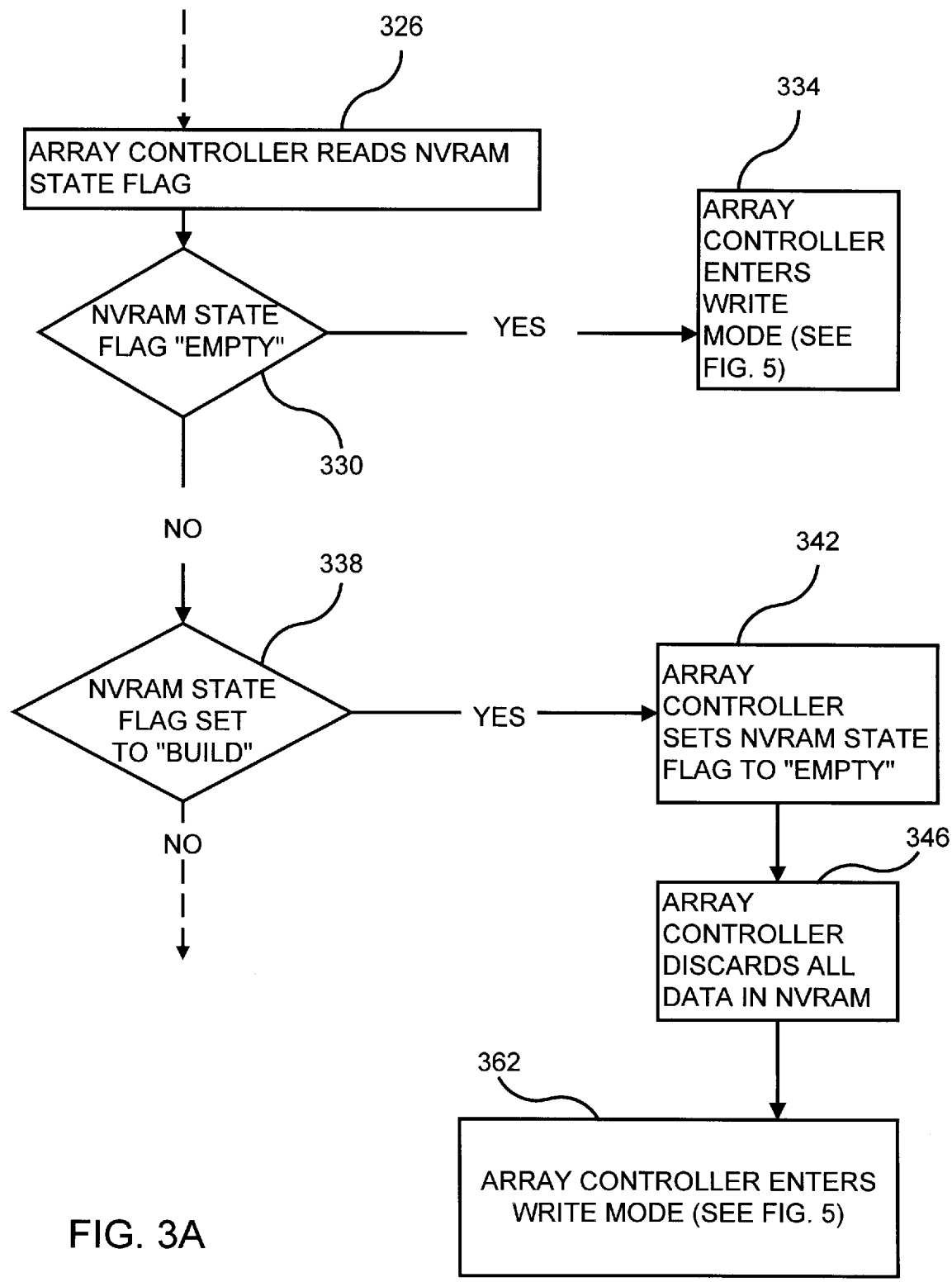

The information in the NVRAM 126 affects the operation of the array controller 114 even upon turn-on of the RAID system of FIG. 1. FIGS. 3A and 3B illustrate the function of the array controller 114 following turn-on of the RAID system of FIG. 1. As illustrated in the flow chart of FIG. 3A, upon turn on, the array controller 114 checks the status of the data in the NVRAM 126 and processes this data depending on the state of state flags 218 in the NVRAM 126. For simplicity, FIGS. 3A and 3B illustrate the array controller 114 checking a single state flag, state flag 218. However, the steps illustrated in FIGS. 3A and 3B for the single state flag 218 are repeated for all state flags stored in the NVRAM 126.

In step 330, the array controller 114 determines whether the state flag 218 is "EMPTY," i.e. set to, for instance, a "00"

state. For the case of the state flag 218 being empty, the array controller 114, in step 334, enters the write mode, as illustrated in FIG. 5, discussed below. While in that write mode, the array controller 114 periodically polls the UPS 118 for the status of the power-out flag 138 using a background process illustrated in FIG. 6 and further described below. As soon as the array controller 114 discovers that the UPS 118 has set the power-out flag 138, the array controller 114 enters the safe write mode of FIGS. 4, or 4A and 4B.

Following a determination in step 330 by the array controller 114 of whether the NVRAM state flag 218 is empty, when the NVRAM state flag 218 is not empty, then, in step 338, the array controller 114 determines whether the NVRAM state flag 218 was set to the "BUILD." For the case when the NVRAM state flag 218 indeed was set to "BUILD," in step 342, the array controller 114 sets the NVRAM state flag 218 to "EMPTY." Thereupon, in step 346, the array controller 114 discards all data in the NVRAM 126. The array controller 114 can discard any data in the NVRAM 126, because while such data was being stored in the NVRAM, as explained above, the CPU 110 was still awaiting confirmation of the successful writing of that data to disk drive set 130. Furthermore, discarding data stored in the NVRAM while the NVRAM state flag 218 is set to "BUILD" is preferable, because it is unclear which of the partially written data is valid (see, for example, NVRAM segment 215 of FIG. 2). So, for simplicity, such data is simply discarded. Following step 346, the array controller 114, in step 362 in FIG. 3B, enters the write mode of FIG. 5.

Next, in step 350 in FIG. 3B, following a determination in step 338 that the NVRAM state flag 218 is not set to "BUILD," the array controller 114 determines whether the NVRAM state flag 218 has been set to "WRITE." (Steps shown in boxes drawn with dashed lines relate to the second embodiment and are discussed further below.) In a further embodiment, step 350 can be omitted, since following elimination as a possibility of the "EMPTY" and the "BUILD" states, the "WRITE" state may be the only possible state left.

In step 354, following a determination that the NVRAM state flag 218 is set to "WRITE," the array controller 114 issues or reissues the write command from the CPU 110. If, for instance, the array controller 114 had partially stored data on disk drive set 130 prior to the failure of power supply 122, then by reissuing the write command from the CPU 110, the array controller 114 is writing over such partially stored data. But for the case when the array controller 114 was precluded by a failure of power source 124 and a subsequent exhaustion of the power supply capacity of the UPS 118 from sending the data to disk drive set 130 in the first place, in step 354, the array controller 114 sends the data to the disk drive set 130 for the first time.

Following step 354, in step 358, the array controller 114 sets the NVRAM state flag 218 to "EMPTY." Thereafter, the array controller 114 executes step 362, as discussed above. If, the array controller 114 determined in step 350 that the NVRAM state flag 218 was not set to "WRITE," then immediately following step 350, the array controller 114 executes step 362.

FIG. 3B also shows the second preferred embodiment, which simplifies storage of data. In addition, the second embodiment also uses less NVRAM 126 memory space than the first embodiment, because the second embodiment does not store parity 229 in NVRAM 126. However, the first embodiment is slightly faster in completing the power up process of FIGS. 3A and 3B. The reason for the greater speed is that the first embodiment need not compute the parity 229, because the parity 229, if it remains to be written to disk drive set 130, already is available in a segment, such as segment 210.

This second embodiment includes steps shown illustrated in boxes drawn with dashed lines in conjunction with some of the steps shown in solid line boxes. As in the first embodiment, once the array controller 114 determines in step 350 that the NVRAM state flag 218 is set to "WRITE," the array controller 114 skips step 354 of the first embodiment. Instead the array controller 114 executes steps 351, 352, and only then 358. In the second embodiment, the array controller 114 never stores the parity 229 in NVRAM 126. The array controller 114 only stores the raw host data 930 (see FIG. 9) in the NVRAM 126. Since parity 229 is never stored in the NVRAM 126, the array controller 114 computes, in step 351, the parity 229 associated with the host data 930 for which the state flag 218 is set to "WRITE." To compute the parity 229, in, for example, RAID level four, the array controller 114 reads data from all disk drives 134 in disk drive set 130 except for the disk drive 134 to which the data associated with the state flag 218 in step 350 should have been written to. Using the old data in conjunction with the new data, i.e., raw data 930, the array controller 114 computes the new parity 229. In addition, in step 351, the array controller 114 stores the data in the NVRAM 126 in disk RAM 128.

In step 352, the array controller 114 issues "WRITE" commands for writing the new data 930 and the new parity 229 to the disk drive set 130. Thereafter, the array controller 114 executes, as in the first embodiment, step 358 for setting the NVRAM state flag 218 to "EMPTY." Finally, in step 362, the array controller 114 enters the write mode.

Figure 4:
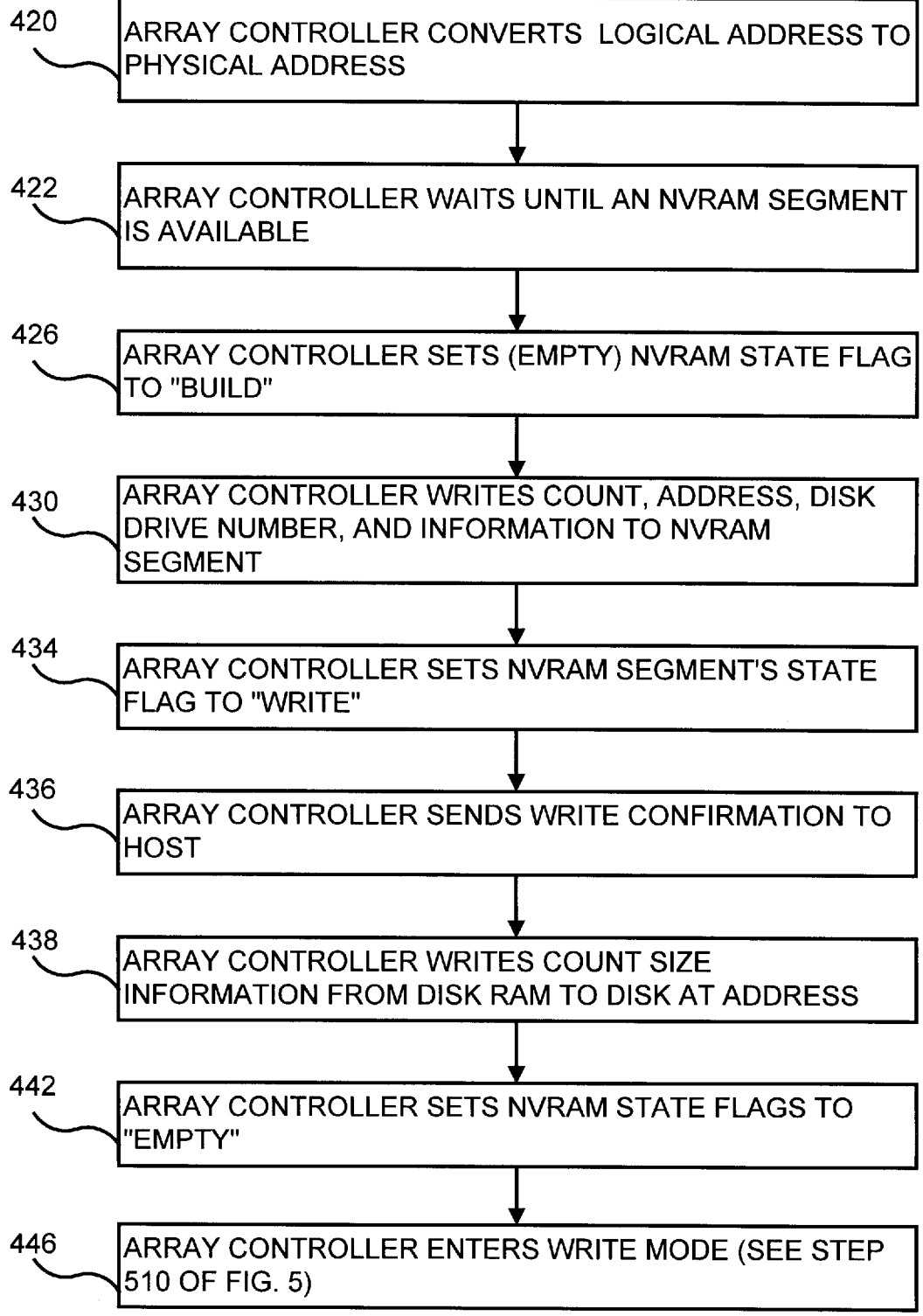
FIG. 4 is a flow chart of the steps performed by the array controller in a safe write mode, in accordance with the first preferred embodiment of the invention.
Figure 4A:
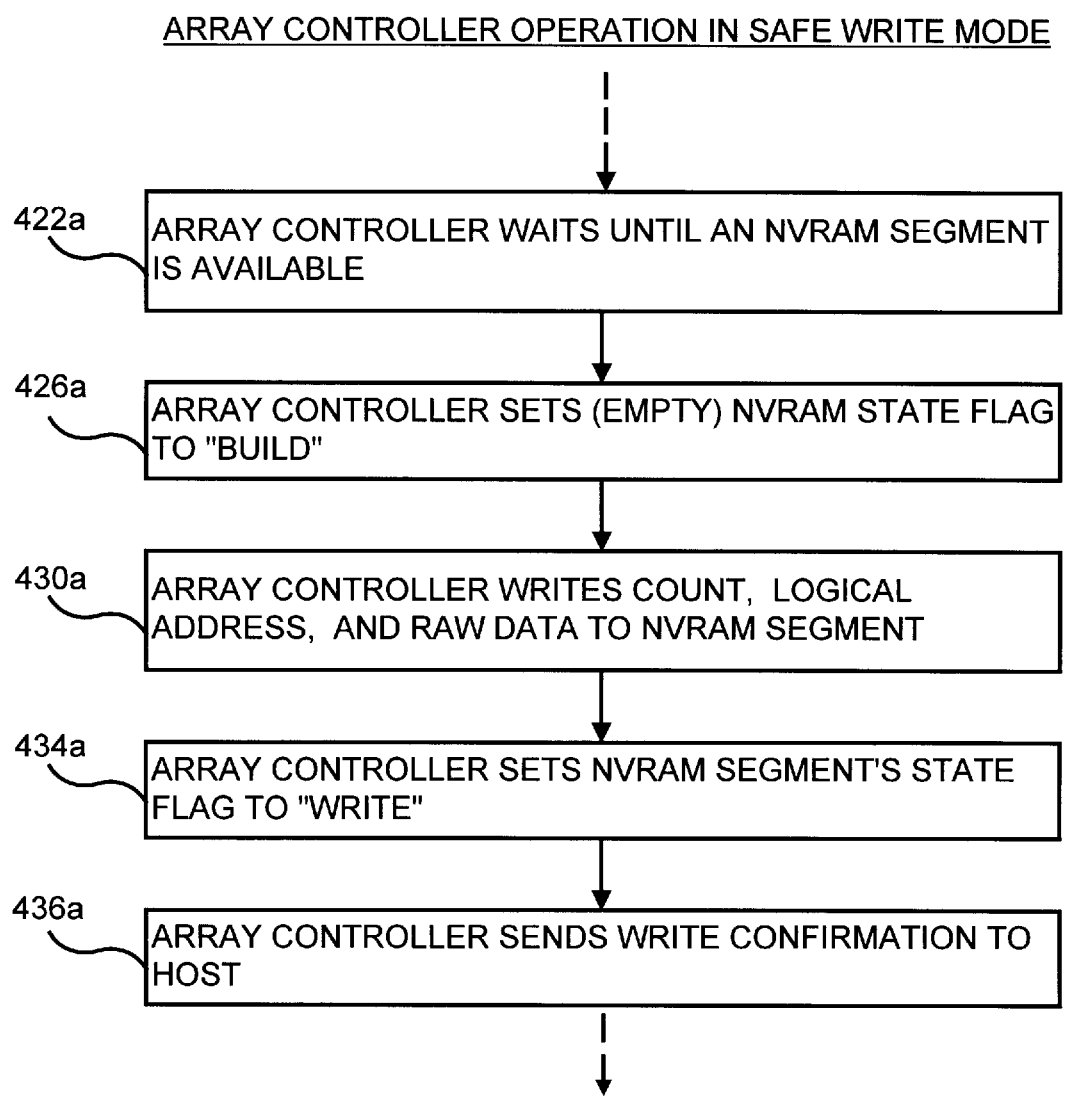
FIGS. 4A and 4B are flow charts of the steps performed by the array controller in safe write modes, in accordance with the second preferred embodiment of the invention.
Figure 4B:
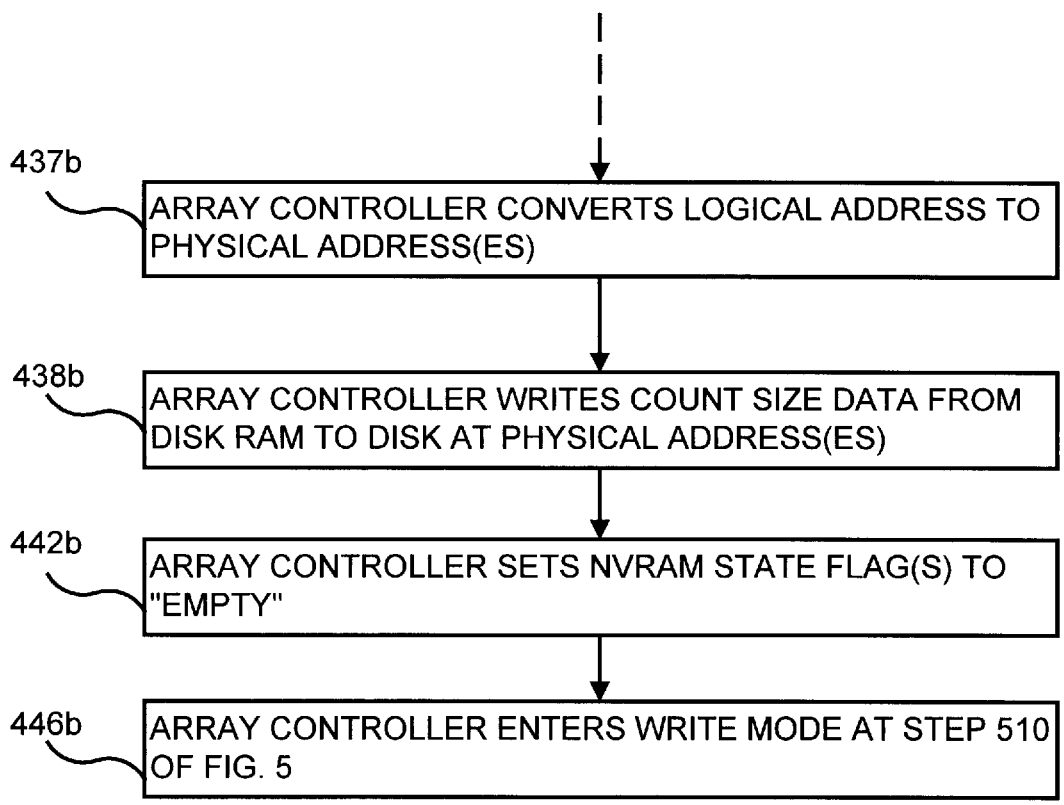
Figure 5A:
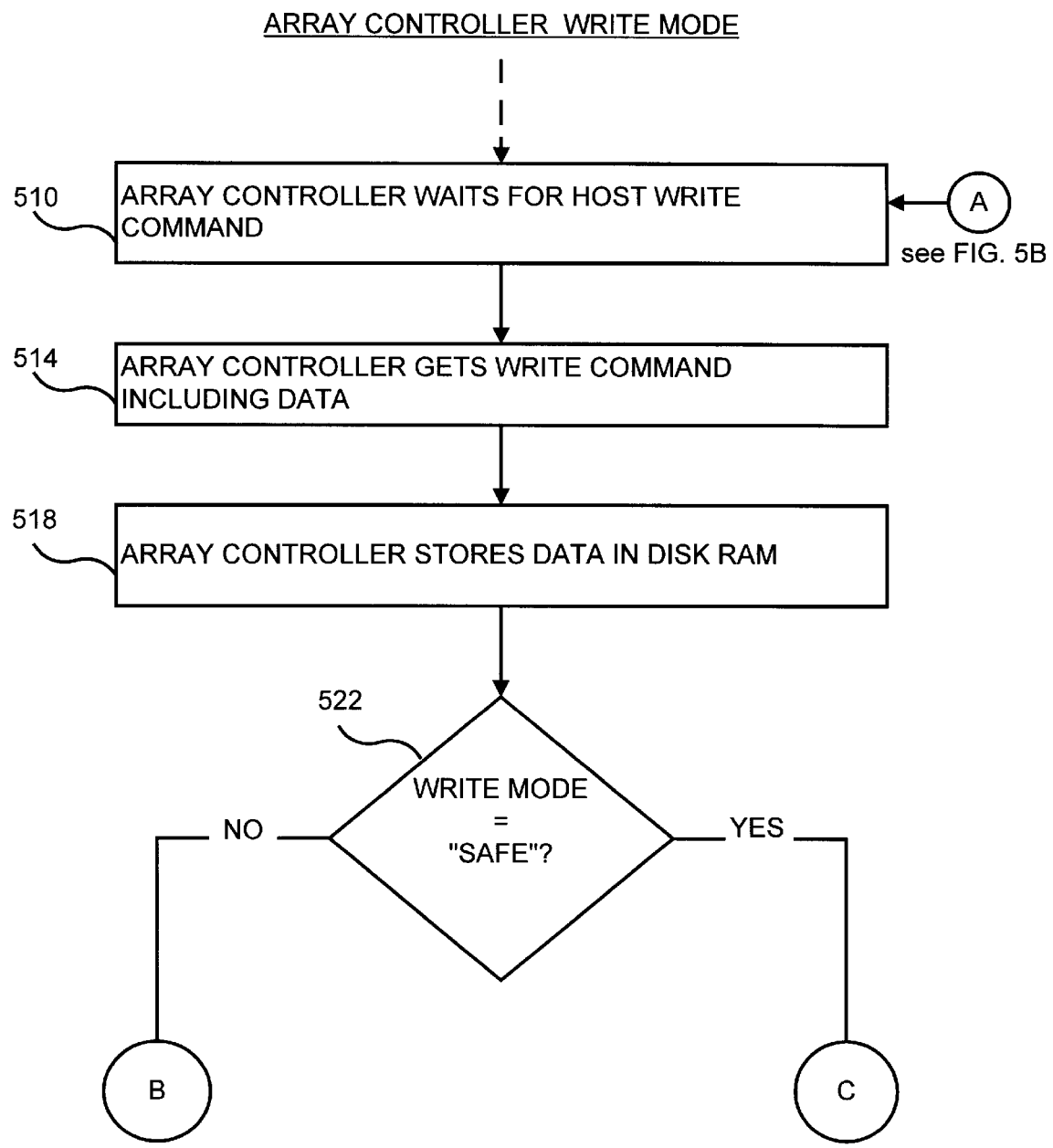
FIGS. 5A and 5B are flow charts of the steps performed by the array controller in a write modes, in accordance with the first and second preferred embodiments of the invention.
Figure 5B:
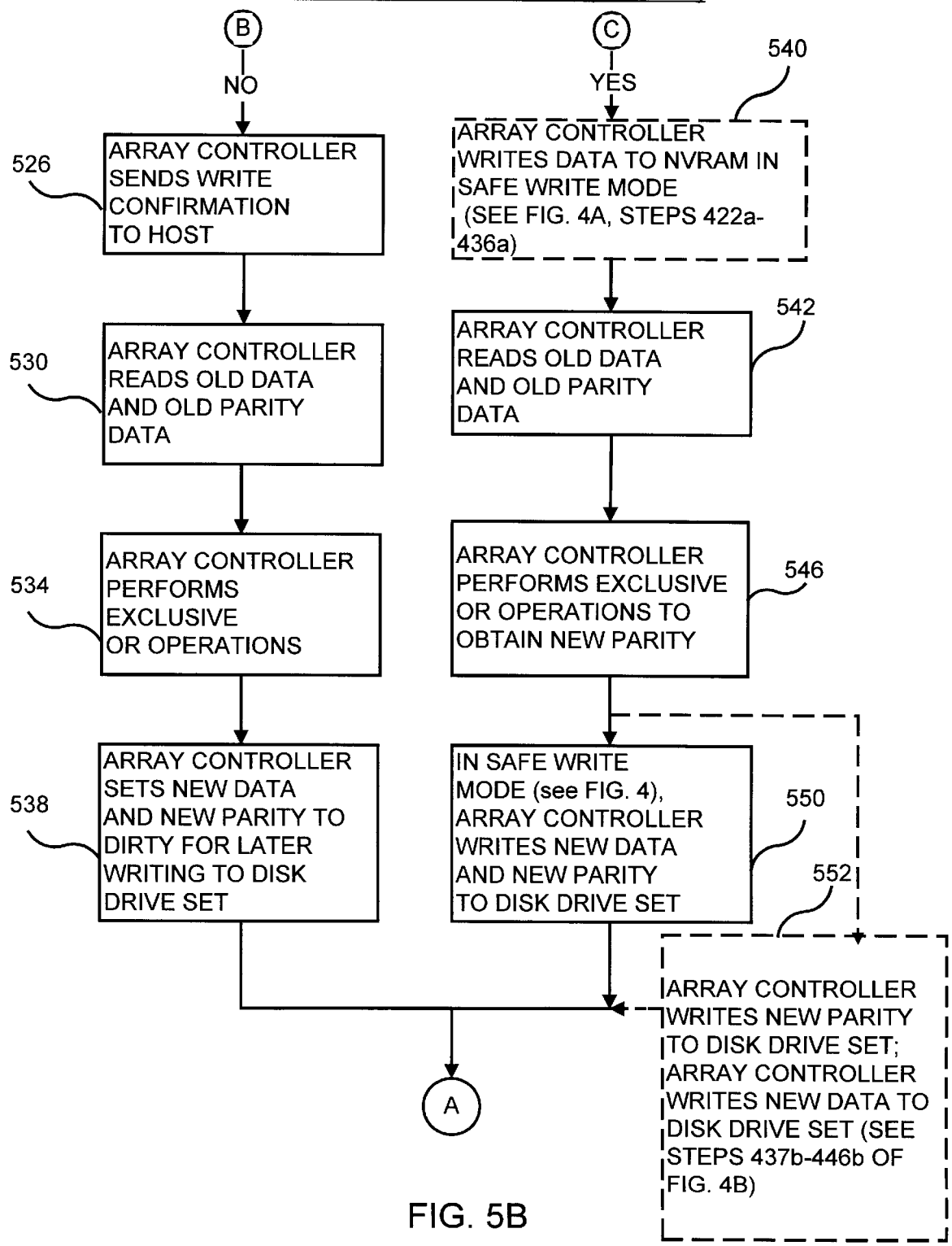

FIGS. 5A and 5B are flow charts for the array controller write mode. In step 510, following completion of its operations upon turn on (per FIGS. 3A and 3B), the array controller 114 begins to idle waiting for a host write command. The host write command includes information for a transactional record, as discussed above. In step 514, the array controller 114 receives the write command including associated raw data 930 from the CPU 110. Thereafter, in step 518, the array controller 114 stores the received data in disk RAM 128. Next, in step 522, the array controller 114 determines whether it should be operating in the safe write mode, described below in FIGS. 4, 4A and 4B. To make this determination, the array controller 114 polls a write mode flag set by the power check background process illustrated below in FIG. 6.

For the case when the array controller 114 does not need to operate in the safe write mode, in step 526 in FIG. 5B, the array controller 114 sends a write confirmation to the CPU 110, i.e., tells the CPU 110 that the raw data 930 from the CPU 110 has been written to disk drive set 130. In step 530, the array controller 114 reads the old data as well as the old parity data, both from disk drive set 130. In step 534, the array controller 114 performs the exclusive OR operations, for instance, as described in the context of the RAID level 4 system described above. In step 538, the array controller 114 sets dirty the new data from the CPU 110 and the new parity data. Dirty data and dirty parity data are data that are flagged as data that the array controller 114 has stored in disk RAM 128 but not yet in disk drive set 130. Later the array controller 114 writes the dirty information to disk drive set 130, as appropriate, depending on the particular RAID level being used by the RAID system of FIG. 1. Following step 538, the array controller 114 resumes waiting for write commands from the CPU 110.

The array controller writes the dirty information (data and/or parity) to the disk drive set 130 in several ways. The array controller 114 employs another background process for periodically storing dirty information. In addition, in step 618 of the power check background process of FIG. 6 discussed below, the array controller 114 also writes dirty information to disk drive set 130. Whenever the disk RAM 128 has no more memory space for storing dirty information, the array controller 114 writes dirty information in the disk RAM 128 to disk drive set 130 to free up memory space for new dirty information. Preferably, this freeing up of memory space occurs after step 514 in FIG. 5A.

Returning to step 522 in FIG. 5A, in step 522, the array controller 114 can determine that it should be operating in the safe write mode. Then, in step 542 in FIG. 5B, as in step 530 (ignoring for the moment the steps in FIG. 5B for the second embodiment shown in the boxes drawn with dashed lines), array controller 114 reads the old data and the old parity data. In step 546, the array controller 114 performs the exclusive OR operations, as discussed with respect to step 534. In step 550, while in the safe write mode described below, the array controller 114 writes the new data and the new parity to disk drive set 130, as appropriate. Thereafter, the array controller 114 returns to waiting for additional write commands from the CPU 110.

FIG. 4 illustrates the operation of the array controller 114 in the safe write mode for the first embodiment. In step 420, the array controller 114 converts the logical address into the physical address(es) and, if appropriate, segments the raw data 930 and its associated parity for distribution into segments, such as segment 214, 210. In step, 422, if there is no room in the NVRAM 126 for storing additional transactional records, the array controller 114 waits until memory space, i.e., an NVRAM segment of sufficient size becomes available for storing the information from the CPU 110.

To determine whether there is sufficient memory space, the array controller 114 searches the segments of the segmented NVRAM 126 for a flag 218 that is "EMPTY." The array controller 114 also searches the NVRAM segments for a count 222 of sufficient size for the data 230 (or parity 229) to be written to disk drive set 130. Of course, in step 422, the wait time will be minimal, if sufficient memory space is available in the NVRAM 126. In step 426, the array controller 114 sets the NVRAM state flag 218 that corresponds to the current transactional record to "BUILD." Next, in step 430, the array controller 114 writes the count 222, the address 226, and data 230, into the available segment 214. The available segment 214 need not be filled completely with the transactional record. The array controller 114 reorganizes any remaining part of the available segment 214 as a new but empty segment 216. In step 434, the array controller 114 sets the NVRAM state flag 218 to "WRITE." Thus, the array controller 114 has recorded in the NVRAM 126 in segment 214 that it is about to begin actually storing data in disk drive set 130. The array controller 114 repeats steps 422-434 for storing in segment 210 the parity 229 computed in step 546 of FIG. 5. (While segments 210, 214 are shown to have different size counts 222, in this example they would likely have counts 222 of the same size.)

In step 436, the array controller 114 sends a write confirmation to the CPU 110. However, the array controller 114 does not send the write confirmation to the CPU 110 until after all data presently being stored actually has been stored in the selected NVRAM segment. So, for instance, the array controller 114 waits until, for example, partially filled NVRAM segment 215 has been completely filled with the data from the CPU 110.

In step 438, the array controller 114 writes the information, such as data 230 and parity 229, of the size specified by the count 222 from the disk RAM 128 to disk drive set 130 and to the disk drive 134 specified by disk number 224 at address 226. Thereafter, in step 442, the array controller 114 sets the NVRAM state flags 218 corresponding to data 230 and parity 229 to "EMPTY." By setting the NVRAM state flags 218 to "EMPTY," the array controller 114 has recorded the fact that it has stored the information corresponding to the particular NVRAM segments in disk drive set 130 and that the particular NVRAM segments are available for storing other transactional records.

Now, in step 446, the array controller 114 reenters the write mode of FIGS. 5A and 5B. In particular, the array controller 114 executes step 510 of the write mode, i.e., the array controller 114 waits for additional CPU 110 write commands.

Figure 9:
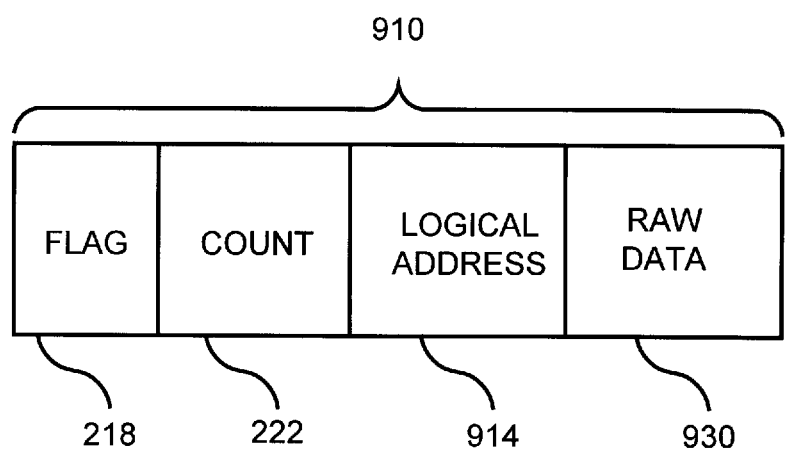
FIG. 9 is a diagram illustrating an NVRAM segment, in accordance with the second preferred embodiment of the invention.

In the second embodiment, which includes the steps shown in FIG. 5B enclosed in boxes drawn with dashed lines, prior to executing step 542, the array controller 114 executes step 540. In step 540, the array controller 114 writes raw data 930 to the NVRAM 126 in another safe write mode. To write data to the NVRAM 126 in this safe write mode, the array controller 114 executes steps 422a-436a, shown in FIG. 4A. Steps 422a-436a are similar to steps 422-436 in FIG. 4. However, in step 430a, unlike in step 430, the array controller 114 writes the raw data count 222, the logical address 914, and the raw data 930 to an NVRAM segment 910, as shown in FIG. 9. Segment 910 is similar to segment 214 in FIG. 2. However, segment 910 does not include a disk drive number 224, since segment 910 stores only a logical address 914 from CPU 110.

Next, the array controller 114 executes steps 542 and 546 as in the first embodiment. Thereafter, the array controller 114 bypasses step 550 and executes step 552 instead. In step 552, the array controller 114 writes the new parity 229 to disk drive set 130. In this embodiment, the array controller 114 never stored the parity 229 in NVRAM 126. Also, in step 552, the array controller 114 writes the new raw data 930 to the disk drive set 130 in the safe write mode by executing steps 437b-446b of FIG. 4B.

In step 437b in FIG. 4B, the array controller 114 first converts the logical address 914 into the physical disk drive address 226. Depending on the particular RAID level, the array controller 114 can distribute the raw data 930 into several parts for distribution into various disk drives 134 of disk drives set 130. Then each part has associated with it a disk drive number 224 and a physical address 226, as indicated by the references to plural in FIG. 4B. Next, in step 442b, the array controller 114 sets the state flag 218 to "EMPTY." Finally, in step 446b, the array controller 114 executes step 446b to resume waiting for another CPU 110 write command.

Figure 6:
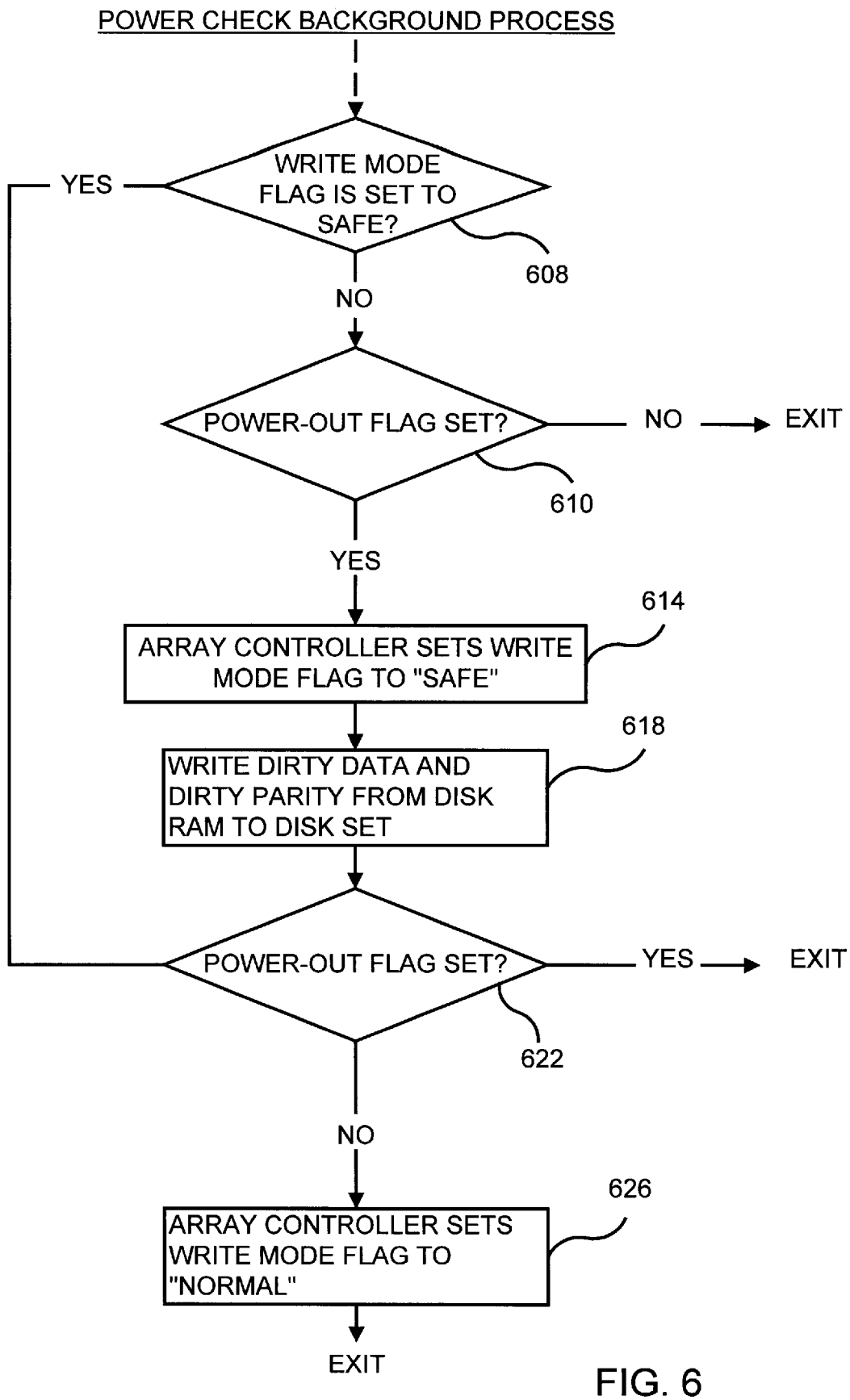
FIG. 6 is a flow chart illustrating steps performed by the array controller to check the status of an AC power source, in accordance with a preferred embodiment of the invention.

As mentioned above, periodically the array controller 114 determines whether there has been a power outage, i.e., a failure of the AC power source 124. To determine the occurrence of such a power failure, the array controller 114 uses a separate power check background process, as illustrated in FIG. 6. At first, the array controller 114 determines whether the write mode flag already has been set to "SAFE" on a prior occasion when executing the process of FIG. 6. If the write mode flag has not been set to "SAFE," then in step 610 of FIG. 6, the array controller 114 determines whether the UPS 118 has set the power-out flag 138. If not, i.e. if the power-out flag 138 is reset, the array controller 114, exits the power check background process of FIG. 6 to resume executing any steps it may have been executing prior to entering the power check background process. However, if the UPS 118 indeed has set the power-out flag 138, then in step 614, the array controller 114 sets the write mode flag to "SAFE." The array controller 114 stores the write mode flag in CPU RAM 762 (see FIG. 7B). In step 618, the array controller 114 writes dirty data and dirty parity data from the disk RAM 128 to the appropriate disk drives in disk drive set 130. Immediately writing all dirty data from disk RAM 128 to disk drive set 130 in case of a power failure helps ensure that data in the disk RAM 128 is not lost. When in step 608, discussed above, the array controller 114 determines that the write mode flag already has been set to "SAFE," then the array controller 114 omits steps 610–618 and proceeds directly to step 622 discussed next.

In step 622, the array controller 114 rechecks the status of the power-out flag 138. When the power-out flag 138 is still set, then the array controller 114 exits the power check background process. So, the write mode flag remains set to "SAFE." Following step 622 upon a determination that the power-out flag 138 is no longer set, the array controller 114 sets the write mode flag to "NORMAL." The array controller 114 reenters the power check background process after a predetermined delay. Then array controller 114 begins executing the power check background process with step 608.

Figure 7A:
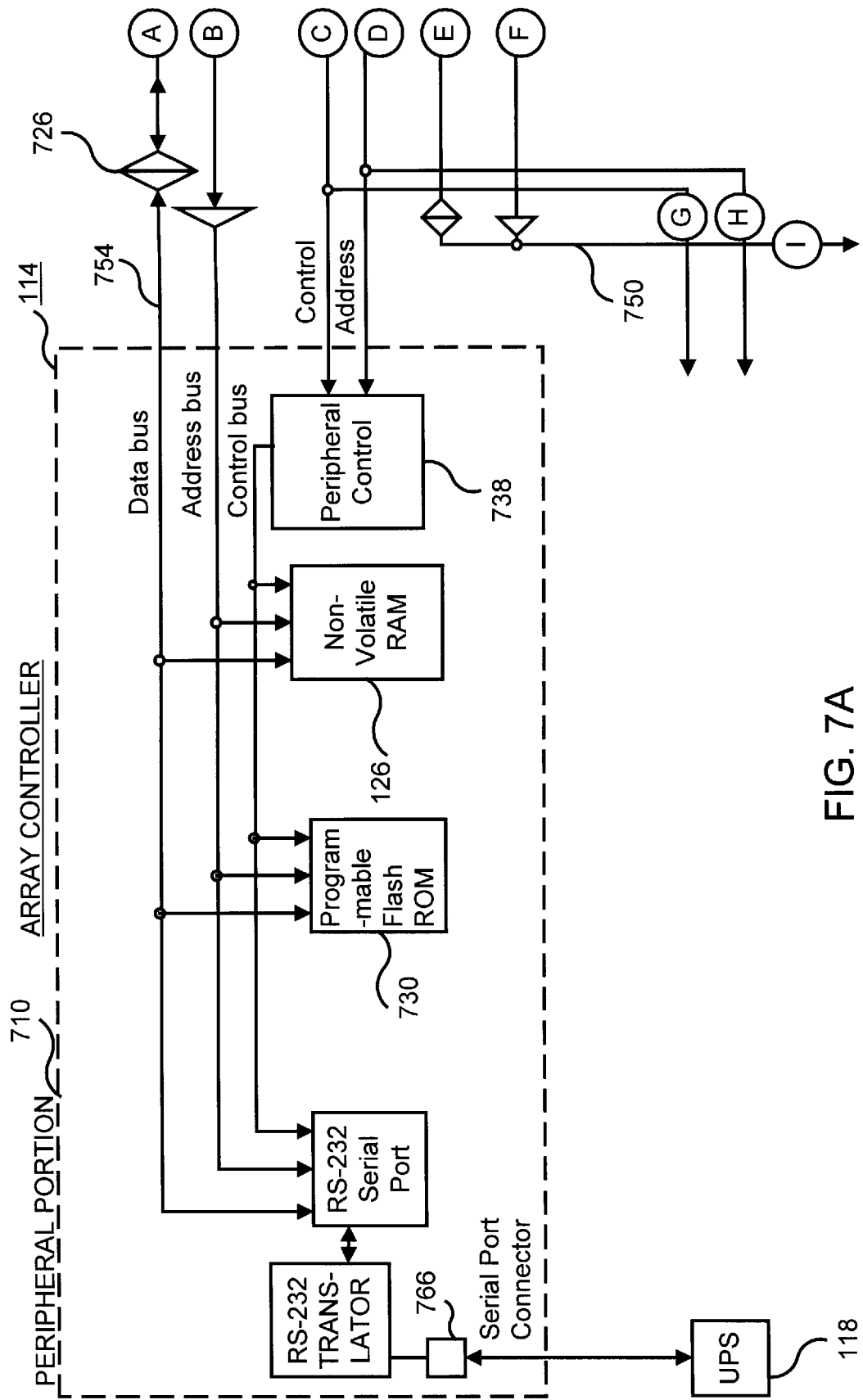
FIGS. 7A, 7B, and 7C are circuit block diagrams illustrating the components of the array controller, in accordance with a preferred embodiment of the invention.
Figure 7B:
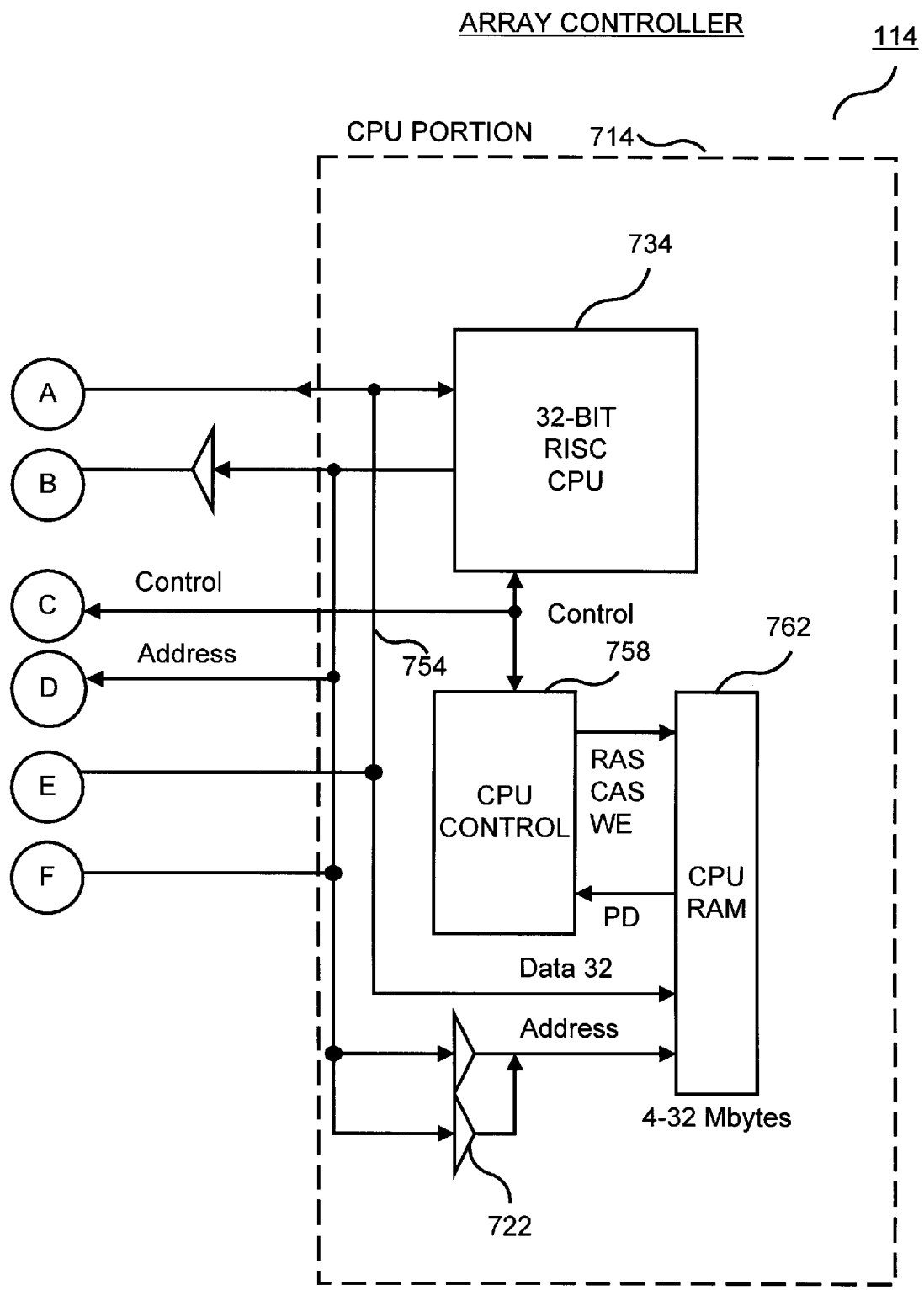
Figure 7C:
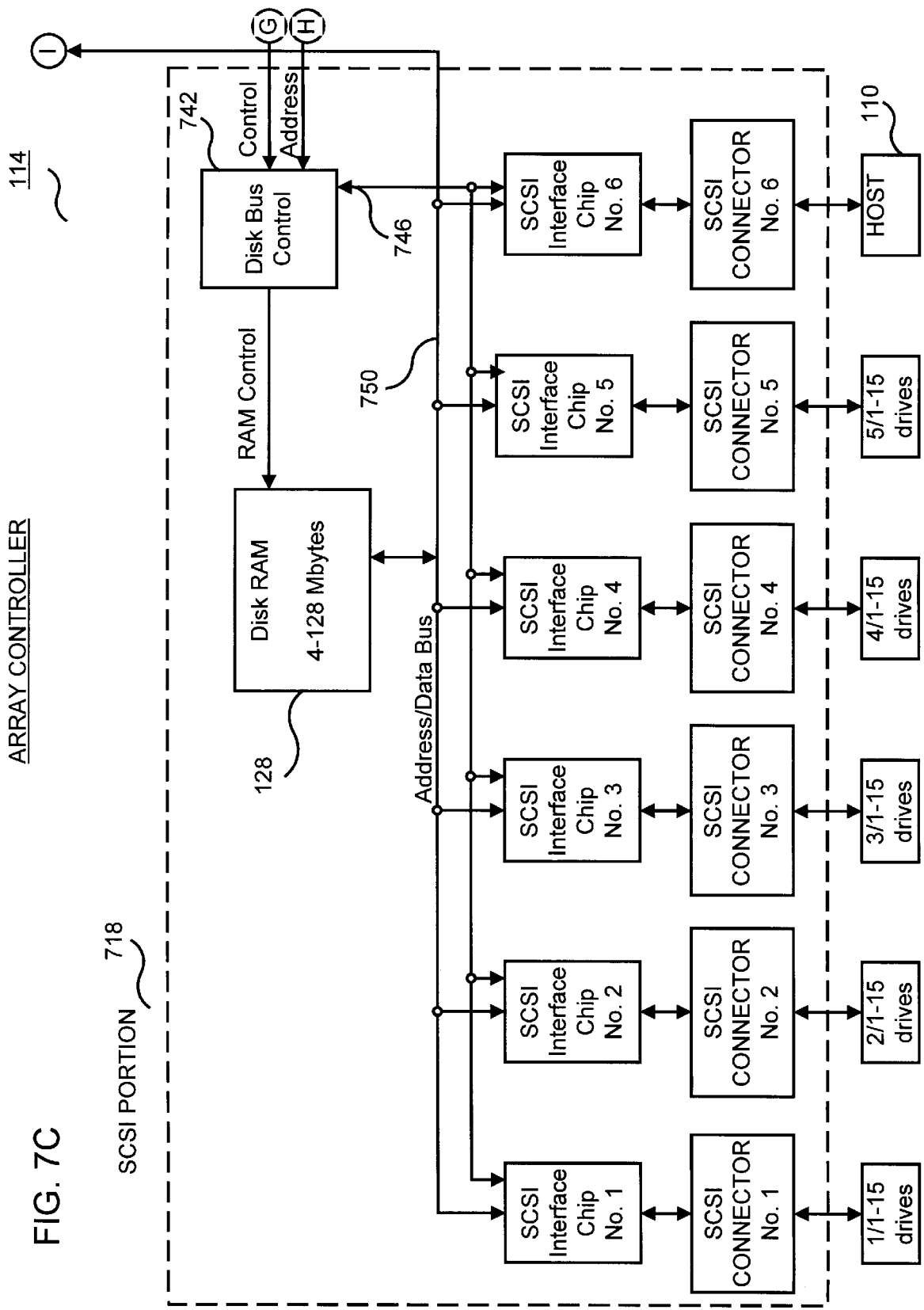
Figure 8:
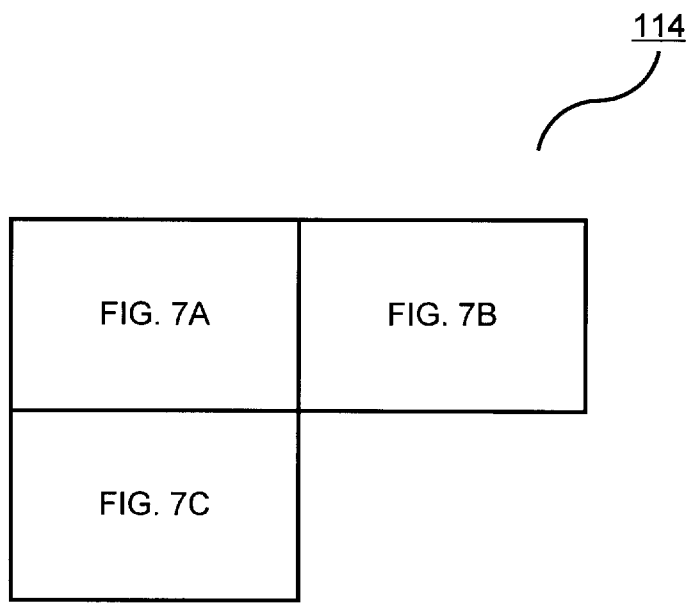
FIG. 8 provides an overview of the relationship between FIGS. 7A, 7B, and 7C.

FIGS. 7A, 7B, and 7C are block circuit diagrams illustrating the components of the array controller 114. FIG. 8 is an overview of how FIGS. 7A, 7B, and 7C are related. As shown in FIGS. 7A, 7B, and 7C, the array controller 114 includes a peripheral portion 710, a CPU portion 714, and a SCSI (Small Computer System Interface) portion 718, respectively. As illustrated in FIG. 7C, the SCSI interface portion 718 includes six SCSI interface chips Nos. 1–6. Each SCSI interface chip is connected to a SCSI connector Nos. 1–6, respectively. Each of SCSI connectors Nos. 1–5 in turn is connected to one of five disk drive sets 130, respectively, each including 15 disk drives. However, SCSI connector No. 6 is connected to the CPU 110. SCSI connector No. 6 also can be further connected, for example, such as to a CD (compact disk) ROM, other disk arrays of the type illustrated by disk drive set 130 in FIG. 1, or to a tape drive.

In FIGS. 7A and 7B, triangles, such as triangle 722 in FIG. 7B, represent latches. The direction in which the tip of triangle 722 is facing indicates the direction in which data is latched into latch 722. Two triangles abutting each other, such as triangles 726 in FIG. 7A, indicate that data can flow through these latches in either direction. Also in FIG. 7A, the programmable flash ROM (read only memory) 730 contains computer code for the array controller 114. When necessary, an array controller's 114 array controller CPU 734, in FIG. 7B, obtains and executes such computer code.

A peripheral control circuit 738 in FIG. 7A translates control signals from the CPU portion 714 into control signals readable by the components in the peripheral portion 710. A CPU control unit 758 of FIG. 7B is coupled to the CPU RAM 762 via row address select (RAS), column address select (CAS), write enable (WE), and parity data (PD) lines. A typical size for the CPU RAM 762 can range from 4–32 Mbytes.

The following illustrates the function of array controller 114 of FIGS. 7A, 7B, and 7C. The CPU 110 sends data to the array controller 114 via SCSI connector No. 6 in FIG. 7C. This data is routed via SCSI interface chip No. 6 in accordance with SCSI control signals sent by the disk bus control circuit 742 via link 746. The data is routed to disk RAM 128. Typical disk RAM size can range from 4–128 Mbytes.

In the safe write mode, the disk bus control circuit 742 in FIG. 7C also routes the data to the CPU portion 714 from Disk RAM 128 via address/data bus 750 and via data bus 754 in the CPU portion. There, in accordance with instructions from the array controller CPU 734, when in the safe mode, the array controller CPU 734 routes the data via data bus 754 to the NVRAM 126 in the peripheral portion of FIG. 7A. To communicate with the peripheral portion 710, the array controller CPU 734 has its CPU control circuit 758 send the appropriate control and address commands to the peripheral control circuit 738 of the peripheral portion 710. To determine whether it should be operating in the safe write mode, the array controller CPU 734 polls the power-out flag 138. The array controller CPU 734 has access to the power-out flag 138 in the UPS 118 via RS-232 (Recommended Standard-232) port 766 in FIG. 7A.

Several preferred embodiments of the present invention have been described. Nevertheless, it will be understood that various modifications may be made without departing from the spirit and scope of the invention. For example, the discussion above has been primarily in terms of a RAID level four system. However, it will be clear to one of ordinary skill in the art based upon the above description that in other embodiments, for example, the invention can be applied to RAID systems with capabilities for all RAID levels. In addition, based on the description herein, one of ordinary skill in the art will understand that there is no need to save data being read from the disk drive set 130 at the time that a power failure occurs. Such data can be re-read once power is available again. Also, while FIG. 7B shows the array controller as having a RISC (Reduced Instruction Set Computer) CPU 734, a non-RISC CPU can be used as well. Furthermore, in another embodiment, the CPU 110 itself instead of the array controller 114 polls the power-out flag 138 to determine whether any power outages have occurred. Indeed, the CPU 110 can perform the functions of the array controller CPU 734, thereby obviating the need for a separate array controller CPU 734.

Another embodiment uses a UPS 118 that includes along with the power-out flag 138 a time remaining indicator that indicates how much longer the UPS 118 can supply power to the array controller 114. Such time remaining indicators can be inaccurate. Consequently, in this embodiment, the array controller 114 remains in the safe write mode, whenever the time remaining is less than an error margin, such as for example 5 minutes. Finally, while the present discussion has been in terms of a RAID system, the invention can be applied to other systems as well. In such other systems, for instance, the disk drive set 130 can be another form of permanent memory, such as non-volatile solid state memory. Thus, the present invention is not limited to the preferred embodiments described herein, but may be altered in a variety of ways, which will be apparent to a person skilled in the art based on the present description.

What is claimed is:

1. A data storage system comprising:
   a non-volatile memory having a plurality of segments; and
   an array controller for coupling to a UPS and periodically polling a power outage flag in the UPS, for coupling to a host CPU, for coupling to a power source, and for coupling to a permanent memory, the array controller coupled to the non-volatile memory for saving write command information upon a failure of the power source.

2. The system of claim 1, wherein the non-volatile memory is a non-volatile random access memory.

3. The system of claim 1, further comprising a volatile memory coupled to the array controller.

4. The system of claim 3, wherein the volatile memory is a volatile random access memory.

5. The system of claim 1, wherein the write command information includes data.

6. The system of claim 1, wherein at least one segment of non-volatile memory includes a transactional record.

7. The system of claim 6, wherein the transactional record includes a flag portion, a count portion, an address portion, and a data portion.

8. The system of claim 7, wherein the data portion of the segment has a variable size.

9. The system of claim 1, wherein at least one segment of non-volatile memory includes parity data.

10. The system of claim 1, wherein the array controller includes a host CPU port for coupling to the host CPU, an array controller CPU, and a UPS port for connecting to the UPS, wherein the host CPU port, the array controller CPU, and the UPS port are coupled to each other via address and data buses.

11. A process for operating a system for preserving data during a power source outage, the process comprising the steps of:

receiving a host write command including at least data from a host CPU;

storing the data in memory;

polling a power outage flag to determine whether there is a power outage;

if there is no power outage, sending a write confirmation to the host CPU;

if there is a power outage, writing the data to non-volatile memory; and if there is a power outage, sending a write confirmation to the host CPU, after the step of writing to non-volatile memory.

12. The process of claim 11, further comprising the step of writing the data to permanent memory.

13. The process of claim 12, further comprising the steps of:

determining upon turn-on of the power of the system whether the non-volatile memory contains a complete transactional record including data; and writing the data of the complete transactional record to the permanent memory.

14. The process of claim 13, wherein the data is parity data.

15. The process of claim 13, further comprising the step of writing dirty information from volatile memory to the permanent memory.

16. The process of claim 12, further comprising the following steps:

if there is a power outage, entering a safe write mode and executing in the safe write mode the following steps:

waiting until a non-volatile memory segment is available;

setting a state flag associated with the available non-volatile memory segment to a build state;

writing a transactional record including data to the non-volatile memory segment;

setting the non-volatile memory segment state flag to a write state;

sending a write confirmation to the host CPU;

storing data in the permanent memory; and setting the non-volatile memory state flag to an empty state.

17. The process of claim 11, wherein the step of determining whether there is a power outage comprises the steps of:

determining whether a power-out flag is set by a UPS; and if the power-out flag is set, setting a write mode flag to indicate a safe write mode.

18. The process of claim 17, wherein the process further comprises the step of setting a write mode flag to a normal state, if the power-out flag is reset.

19. A data storage system comprising:

a non-volatile memory having a plurality of segments;

a UPS having a power outage flag;

a host CPU;

a power source;

a permanent memory; and an array controller coupled to the UPS and periodically polling the power outage flag in the UPS, host CPU, power source, and permanent memory, the array controller coupled to the non-volatile memory for saving write command information including at least data upon a failure of the power source.

20. The system of claim 19, wherein the non-volatile memory is a non-volatile random access memory.

21. The system of claim 19, further including a volatile memory coupled to the array controller.

22. The system of claim 21, wherein the volatile memory is a volatile random access memory.

23. An apparatus for preserving data during a power source outage, the apparatus comprising:

means for receiving a host write command including the data from a host;

means for storing the data in memory;

means for determining whether there is a power outage;

means for sending a write confirmation to the host if there is no power outage;

means for writing the data to non-volatile memory if there is a power outage; and means for sending a write confirmation to the host after writing to non-volatile memory if there is a power outage.

* * * * *